(12) United States Patent
Teegarden

(10) Patent No.: US 9,332,746 B2
(45) Date of Patent: May 10, 2016

(54) FISHING LINE WOBBLE DEVICE

(71) Applicant: Dean Mark Teegarden, Boise, ID (US)

(72) Inventor: Dean Mark Teegarden, Boise, ID (US)

( * ) Notice: Subject to any disclaimer, the term of this patent is extended or adjusted under 35 U.S.C. 154(b) by 192 days.

(21) Appl. No.: 14/166,739

(22) Filed: Jan. 28, 2014

(65) Prior Publication Data

US 2014/0208631 A1    Jul. 31, 2014

Related U.S. Application Data

(60) Provisional application No. 61/757,482, filed on Jan. 28, 2013.

(51) Int. Cl.
*A01K 91/06*      (2006.01)

(52) U.S. Cl.
CPC .................................. *A01K 91/065* (2013.01)

(58) Field of Classification Search
CPC ....... A01K 85/00; A01K 85/12; A01K 85/14; A01K 91/065; A01K 97/00
USPC ............ 43/42.02, 42.03, 42.22, 42.23, 42.45, 43/42.47, 43.1, 43.13, 43.14, 44.87, 44.88, 43/44.9
IPC ..................... A01K 85/00, 85/12, 85/14, 91/06, A01K 97/00
See application file for complete search history.

(56) References Cited

U.S. PATENT DOCUMENTS

| | | | | |
|---|---|---|---|---|
| 2,332,400 A | * | 10/1943 | Richardson | A01K 85/02 33/1 B |
| 2,685,756 A | * | 8/1954 | Mowbray | A01K 97/06 43/57.1 |
| 2,713,742 A | | 7/1955 | Holdaway | |
| 2,795,075 A | | 6/1957 | Christian | |
| 2,804,713 A | * | 9/1957 | Johnson | A01K 85/00 43/42.2 |
| 2,883,785 A | | 4/1959 | Croft | |
| 2,926,452 A | * | 3/1960 | Lewis | A01K 91/06 114/221 R |
| 3,170,756 A | * | 2/1965 | Butler | A01K 83/00 43/42.1 |
| 3,533,187 A | | 10/1970 | Campbell | |
| 3,729,850 A | | 5/1973 | Waters, Jr. | |
| 3,815,274 A | * | 6/1974 | Schleif | A01K 85/02 43/42.1 |
| 3,879,881 A | | 4/1975 | Vick | |
| 4,139,964 A | * | 2/1979 | Pelletier | A01K 91/06 43/42.19 |
| 4,217,721 A | * | 8/1980 | Hershberger | A01K 83/00 43/42.1 |
| 4,739,576 A | | 4/1988 | Davis | |
| 4,796,379 A | | 1/1989 | Rabideau | |
| 4,823,495 A | | 4/1989 | Camilleri | |
| 4,891,901 A | | 1/1990 | Baker, Jr. | |
| 5,167,088 A | * | 12/1992 | Wardall | A01K 85/00 43/42.03 |
| 5,197,221 A | | 3/1993 | Kresl | |
| D349,941 S | | 8/1994 | Gentry | |
| 5,528,851 A | | 6/1996 | Feher | |
| 5,661,922 A | | 9/1997 | Bonomo | |

(Continued)

FOREIGN PATENT DOCUMENTS

| | | | | |
|---|---|---|---|---|
| CA | | 1287211 C | 8/1991 | |
| WO | WO 2014065737 A1 | * | 5/2014 | ............. A01K 83/06 |

OTHER PUBLICATIONS

Product packaging for "Eaker Shaker +" by Eagle Claw, 1998.

*Primary Examiner* — Lisa Tsang
(74) *Attorney, Agent, or Firm* — Buchanan Nipper

(57) ABSTRACT

A fishing line wobble device for causing a fishing hook attached to a fishing line to wobble as said fishing hook is pulled through water. The fishing line deflector having a deflector for deflecting water, and an elongated line guide. The deflector having a plurality of voids disposed about the rim of the deflector.

20 Claims, 7 Drawing Sheets

(56) References Cited

U.S. PATENT DOCUMENTS

| | | |
|---|---|---|
| D388,495 S | 12/1997 | Gentry |
| 5,887,378 A | 3/1999 | Rhoten |
| 5,918,406 A | 7/1999 | Wilson |
| 6,061,948 A * | 5/2000 | Boucek ................. A01K 85/00 43/42.09 |
| 6,083,076 A | 7/2000 | Saint-Victor |
| 6,173,524 B1 | 1/2001 | Kinchen, Sr. |
| D462,413 S | 9/2002 | Teegarden |
| 7,003,911 B2 | 2/2006 | Schoenike |
| 7,490,433 B2 | 2/2009 | Schoenike |
| 7,877,924 B2 | 2/2011 | Schoenike |
| 8,020,338 B2 | 9/2011 | Brown |
| 2003/0070344 A1 | 4/2003 | Teegarden |
| 2005/0279011 A1 * | 12/2005 | Schoenike ............ A01K 93/02 43/44.91 |
| 2011/0131863 A1 * | 6/2011 | Parcell .................. A01K 85/02 43/41 |

* cited by examiner

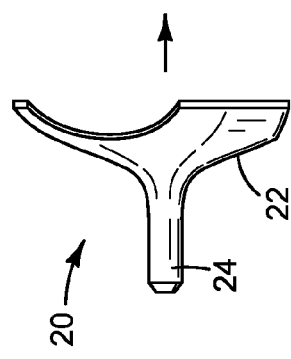
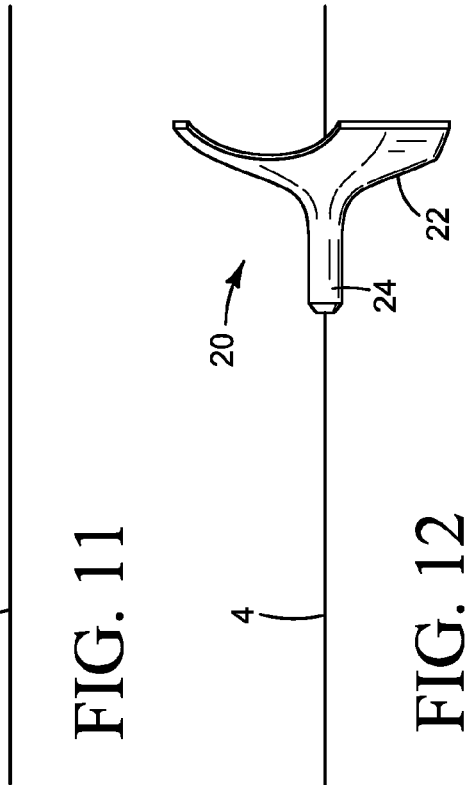
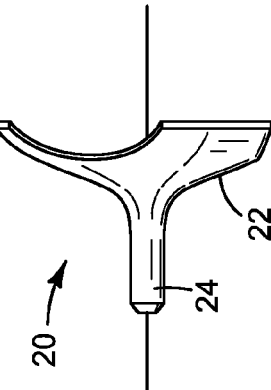
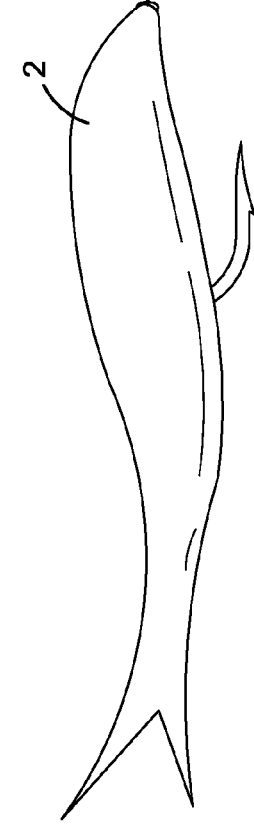
FIG. 11
FIG. 12
FIG. 13

FISHING LINE WOBBLE DEVICE

PRIORITY/CROSS-REFERENCE TO RELATED APPLICATIONS

This application claims the benefit of U.S. Provisional Application No. 61/757,482, filed 28 Jan. 2013, the disclosure of which is incorporated by reference.

TECHNICAL FIELD

The disclosure generally relates to fishing lures, and more particularly to fishing lure accessories used to make a fishing line wobble as it is drawn through the water, thereby imparting movement to a fishing lure attached to the fishing line.

BACKGROUND

As a fishing lure is drawn through the water, it is often advantageous to the fisherman to have the lure mimic the natural swimming patterns or behaviors of a juvenile fish or other food source of the fish to be caught. Typically, this wobbling effect is created through the use of a water deflection device. These water deflection devices range from spoons, to baffles (Rhoten, U.S. Pat. No. 5,887,378), and to spinners (Baker, Jr., U.S. Pat. No. 4,891,901).

A typical spoon is rotatably attached at one end to the fishing tackle. Then as the tackle is drawn through the water, the spoon deflects water and is able to revolve around the axis defined by the fishing line via a pivoting attachment. A spoon imparts a wobbling motion to the lure as well as creating a visual display (or pressure disturbance in the water) which attracts the attention of fish.

A typical baffle operates by deflecting water (thereby deflecting the lure itself), with the deflection of the lure causing the desired effect (wobbling). An example of a baffle is shown in U.S. Pat. No. 2,713,742 (Holdaway). Holdaway's fishing hook baffle snaps onto the shaft of a hook. Another example is U.S. Pat. No. 5,918,406 (Wilson). Wilson's wiggling fishing lure utilizes a dual segmented, generally L-shaped baffle having the lure attaching to the end of one segment and the line attaching to the center of the second segment. Another baffle is shown in U.S. Pat. No. 2,795,075 (Christian). Christian's fishing lure utilizes a bow-shaped baffle able to pivot at the center of the bow.

A typical spinner operates by spinning through the water as the lure is drawn. Spinners tend to do two things: (1) cause the lure to spin, or (2) creates a visual display (or pressure disturbance in the water) which attracts the attention of fish.

Additionally, known is also the use of diving plates or planes for causing a lure to dive as drawn through the water, thereby allowing the lure to be used at deeper depths without resulting to using sinkers or weights to sink the lure. Examples of diving planes can be seen on Davis (U.S. Pat. No. 4,739,576), Francklyn (U.S. Pat. No. 4,869,014), and Even (U.S. Pat. No. 6,016,622).

BRIEF DESCRIPTION OF THE DRAWINGS

FIG. 11 is a first environmental sequential view of the fishing line wobble device of FIG. 6.

FIG. 12 is a second environmental sequential view of the fishing line wobble device of FIG. 6.

FIG. 13 is a third environmental sequential view of the fishing line wobble device of FIG. 6.

DETAILED DESCRIPTION

The following description and the referenced drawings provide illustrative examples of that which the inventor regards as his invention. As such, the embodiments discussed herein are merely exemplary in nature and are not intended to limit the scope of the invention, or its protection, in any manner. Rather, the description and illustration of these embodiments serve to enable a person of ordinary skill in the relevant art to practice the invention.

The use of "e.g.," "etc," "for instance," "in example," "for example," and "or" and grammatically related terms indicates non-exclusive alternatives without limitation, unless the context clearly dictates otherwise. The use of "including" and grammatically related terms means "including, but not limited to," unless the context clearly dictates otherwise. The use of the articles "a," "an" and "the" are meant to be interpreted as referring to the singular as well as the plural, unless the context clearly dictates otherwise. Thus, for example, reference to "a curved void" includes two or more such curved voids, and the like. The use of "optionally," "alternatively," and grammatically related terms means that the subsequently described element, event or circumstance may or may not be present/occur, and that the description includes instances where said element, event or circumstance occurs and instances where it does not. The use of "preferred," "preferably," and grammatically related terms means that a specified element or technique is more acceptable than another, but not that such specified element or technique is a necessity, unless the context clearly dictates otherwise. The use of "exemplary" means "an example of" and is not intended to convey a meaning of an ideal or preferred embodiment. Words of approximation (e.g., "substantially," "generally"), as used in context of the specification and figures, are intended to take on their ordinary and customary meanings which denote approximation, unless the context clearly dictates otherwise.

FIGS. 1 through 8 are from the inventor's prior published patent application for a "fishing wobble device" (US 2002/0095853, filed in January 2001), the teachings of which are incorporated herein by reference.

Disclosed in the inventor's prior application and in the present description is a fishing line wobble device for causing fishing line drawn through water to wobble, thereby imparting motion to fishing tackle attached to the fishing line.

Generally, attachment to the fishing line is achieved by simply sliding the device onto the fishing line before the bait or lure is tied on or otherwise secured, without any modification of the tackle itself. This way, the fisherman is able to add wobbling functionality to his/her existing lures and other tackle without modifying the existing tackle.

Figure 4:
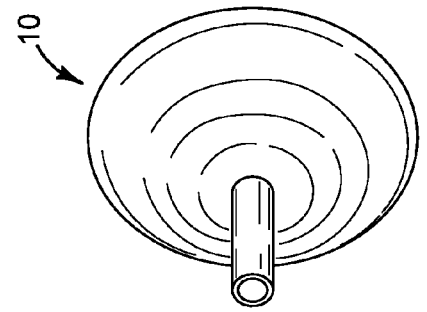
FIG. 4 is a perspective view of the PRIOR ART fishing line wobble device of FIG. 1.
Figure 3:
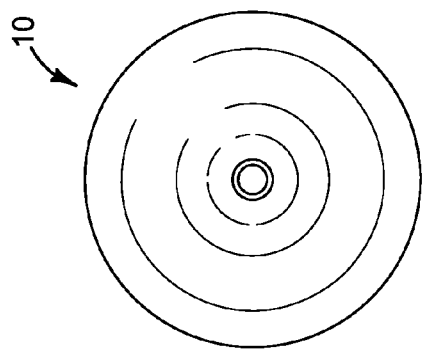
FIG. 3 is a back view of the PRIOR ART fishing line wobble device of FIG. 1.
Figure 2:
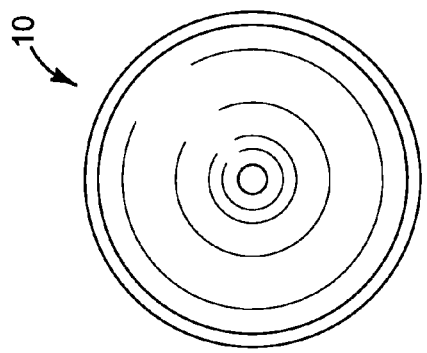
FIG. 2 is a front view of the PRIOR ART fishing line wobble device of FIG. 1.
Figure 1:
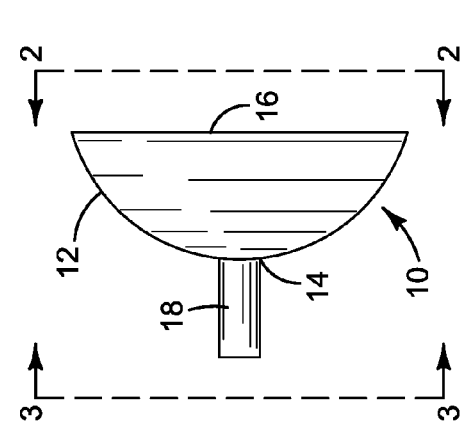
FIG. 1 is a side view of a PRIOR ART fishing line wobble device.

Initially referring to FIG. 1, illustrated is a fishing line wobble device 10 comprising a deflector 12 and a line guide 18. The deflector 12 is generally cup-shaped, having an apex 14 and a rim 16. At or near the apex 14, the line guide 18 extends through the deflector 12. The length of the line guide 18 is generally perpendicular to the rim 16. In use, the rim 16 end of the wobble device 10 would be oriented on the fishing line generally facing the fishing pole, and the line guide 18 end of the wobble device 10 would be oriented on the fishing line generally facing the fishing hook or lure. FIG. 2 shows a front view, FIG. 3 a rear view, and FIG. 4 a perspective view thereof.

Figure 5:
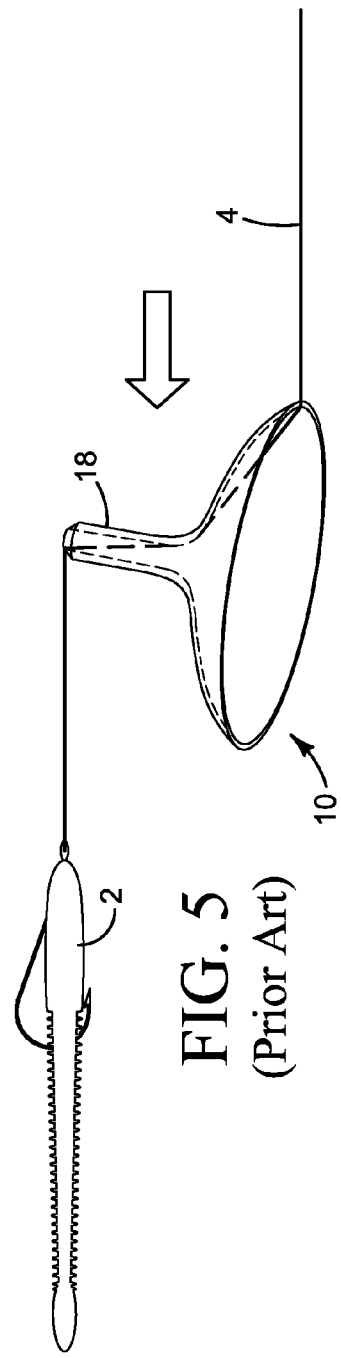
FIG. 5 is an environmental view of the PRIOR ART fishing line wobble device of FIG. 1.
Figure 6:
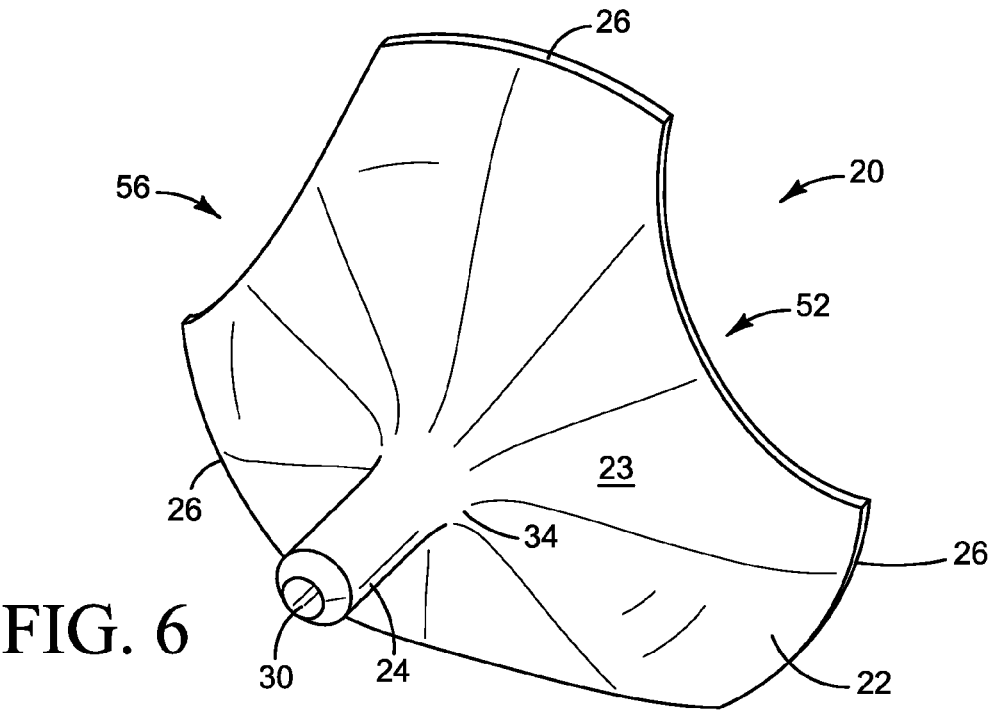
FIG. 6 is a rear, upper perspective view of the first exemplary fishing line wobble device.
Figure 7:
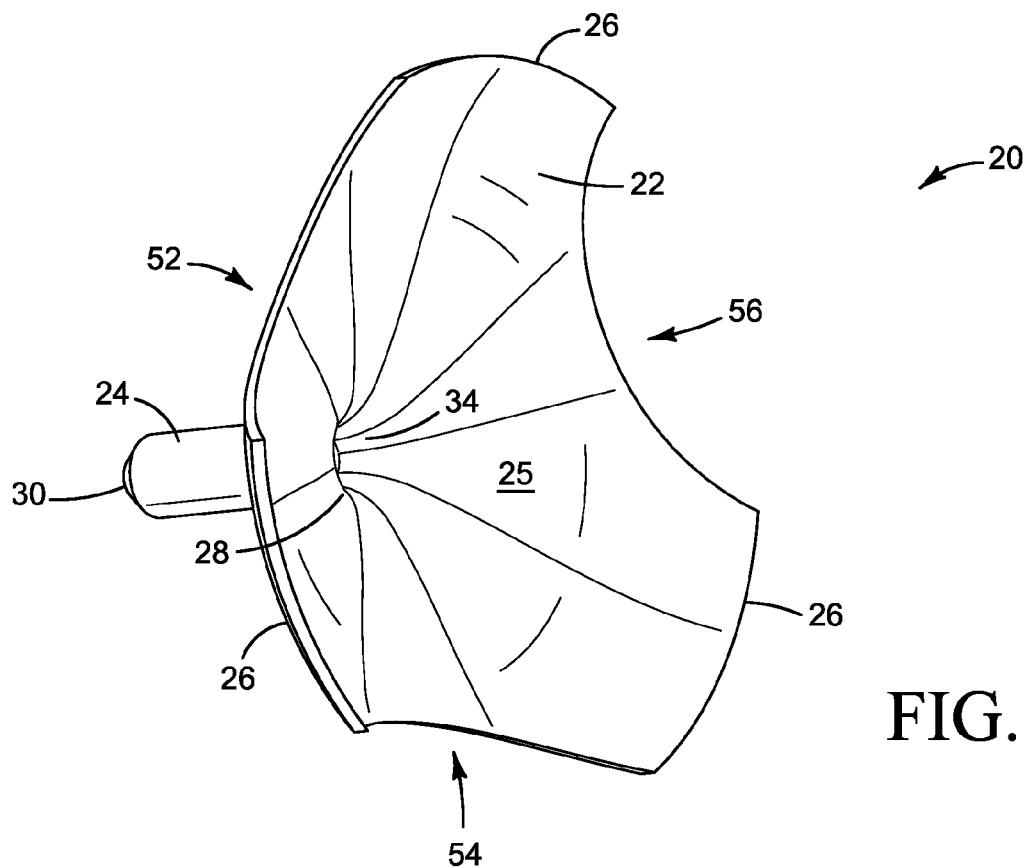
FIG. 7 is a front, lower perspective view of the fishing line wobble device of FIG. 6.
Figure 9:
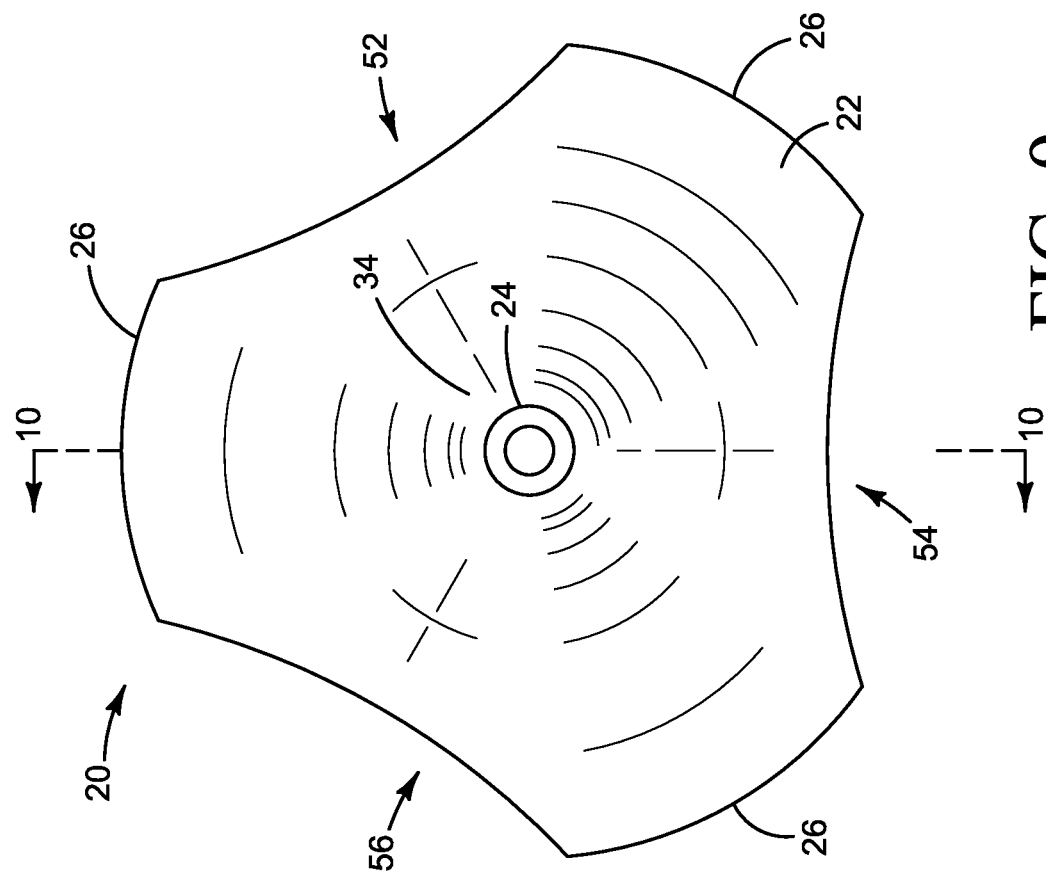
FIG. 9 is a rear elevation view of the fishing line wobble device of FIG. 6.
Figure 8:
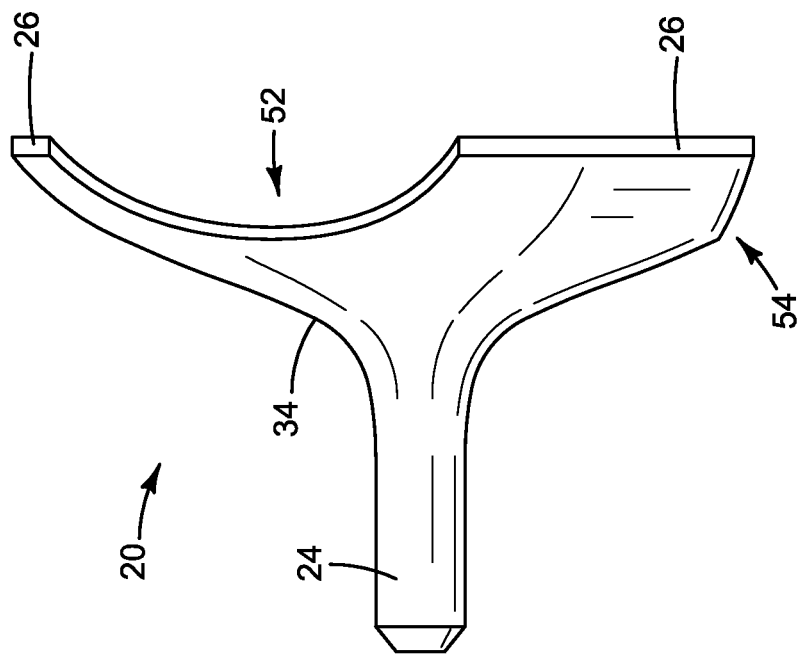
FIG. 8 is a side elevation view of the fishing line wobble device of FIG. 6.
Figure 10:
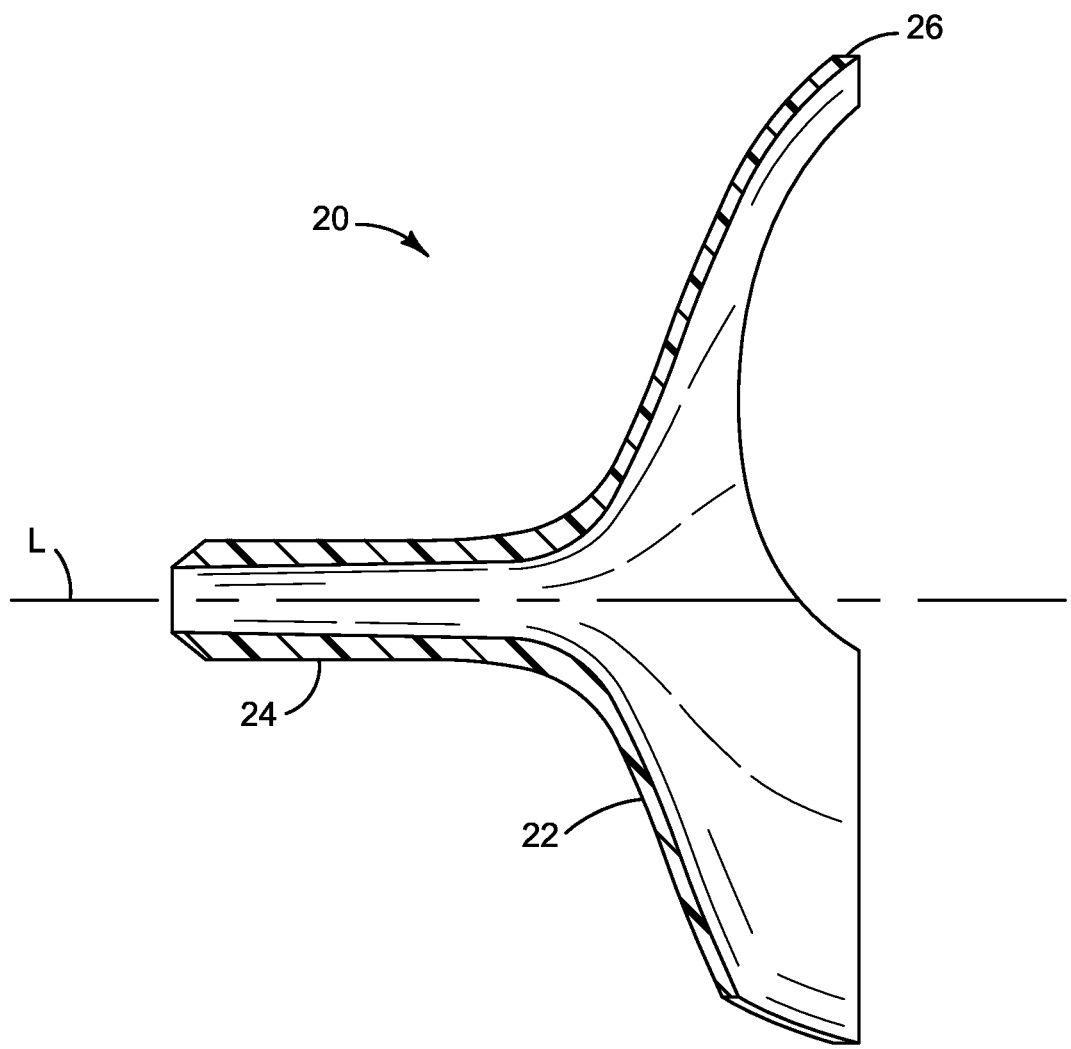
FIG. 10 is cross-sectional view of the fishing line wobble device of FIG. 6 along the lines 10-10 of FIG. 9.
Figure 14A:
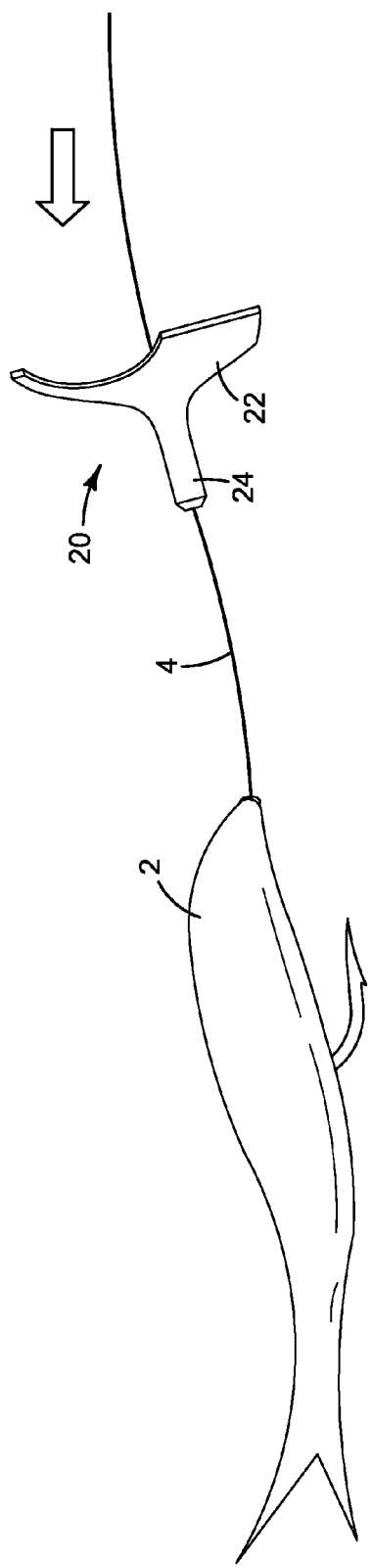
FIG. 14A is a fourth environmental sequential view of the fishing line wobble device of FIG. 6.
Figure 14B:
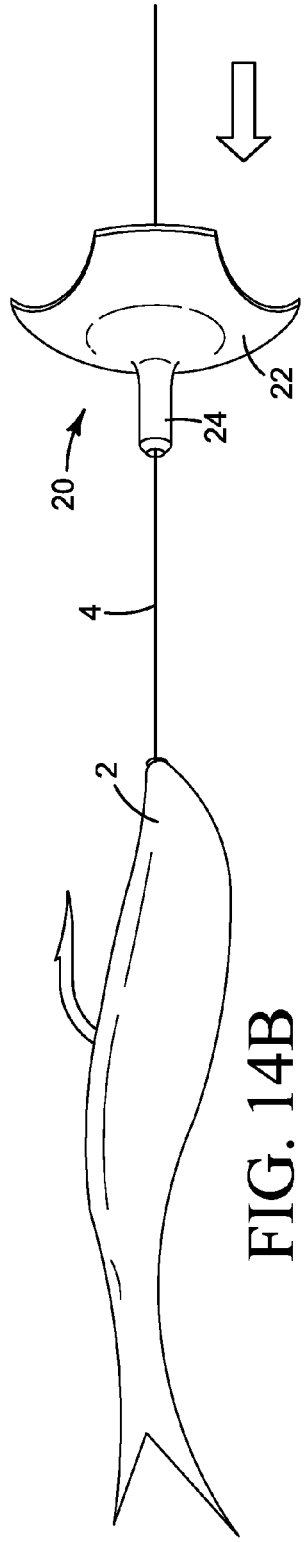
FIG. 14B is a fourth environmental sequential view of the fishing line wobble device of FIG. 6.
Figure 14C:
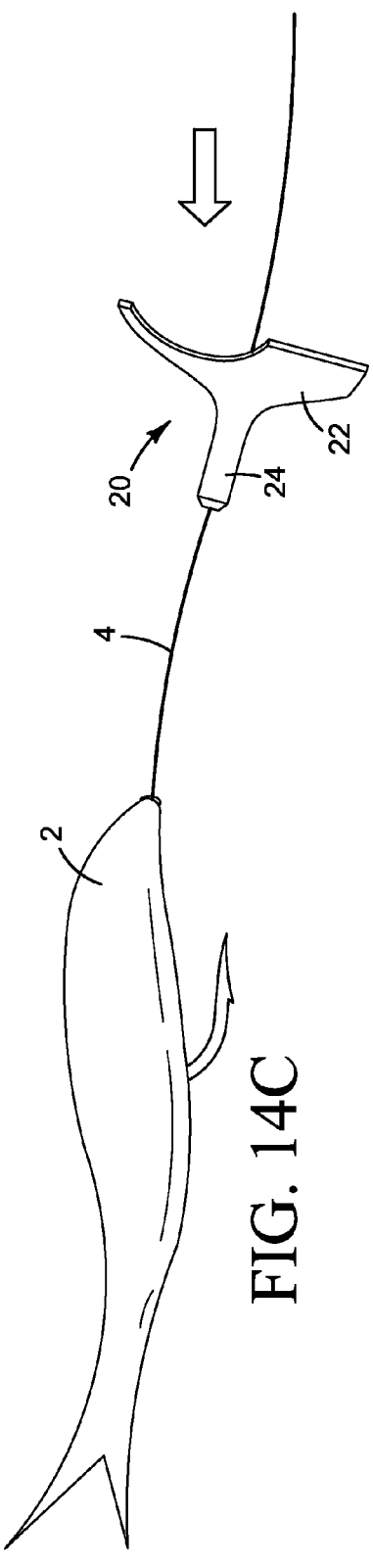
FIG. 14C is a fourth environmental sequential view of the fishing line wobble device of FIG. 6.

Referring now to FIG. 5, a perspective, environmental view of the prior art fishing line wobble device 10 is illustrated. FIG. 5 illustrates the orientation, in use, of the fishing line wobble device 10 after it has over-rotated. Illustrated is a length of fishing line 4 extending into the cup of the deflector 12, in the first end of the line guide 18, through the line guide 18, and out of the second end of the line guide 18. This fishing line 4 would be then used to tie on a fishing lure/tackle, such as the fishing tackle 2 illustrated.

In use, when the line 4 is pulled through the water, high pressure forms on the front side of the deflector, and low pressure forms on the rear side of the deflector. This instability causes the cup of the deflector 12 to deflect water and wobble, causing the attached line guide 18 to wobble against (repeatedly contact) the fishing line 4, imparting energy to the line 4 itself, this line energy or vibration causing the attached fishing hook or lure 2 to itself to move or wobble through the water. Thus, the line guide 18 acts as a lever against the fishing line 4, applying energy from the water resulting from the deflection of the deflector, this energy being applied to the fishing line 4 as a vibration or movement, thereby resulting in the imparting of movement to the attached fishing lure or hook.

In such a configuration, it is possible for the deflector 12 to over-wobble and hydrostatically held in a deflected position (illustrated in FIG. 5), thereby decreasing the performance of the fishing line wobble device 10 when certain bait styles, weights and sizes of bait are used (e.g., when the weight and/or water resistance of the bait is insufficient to pull on the line guide enough to right the fishing line wobble device).

To wit, the inventor has invented a modification to his previous fishing line wobble device that is resistant to over-rotation. The fishing line wobble device comprising a deflector and an elongated line guide, the deflector for deflecting water, wherein said deflector is generally cup-shaped, the general cup-shape defining an apex opposite a rim, the elongated line guide having first and second ends for slidably engaging the fishing line, the line guide extending through the deflector at the apex, the line guide attached to the deflector, wherein the deflector comprises a plurality of voids disposed about the rim of the deflector.

A first embodiment of the inventor's improvement, the first exemplary fishing line wobble device 20, is illustrated in FIGS. 6 through 10. FIGS. 11 through 14C illustrate the first exemplary fishing line wobble device 20 in use. This exemplary fishing line wobble device 20 can be used in the same manner as the prior art fishing line wobble devices illustrated in FIGS. 1 through 5.

As illustrated in FIGS. 6 through 14C, the first exemplary fishing line wobble device 20 comprises a deflector 22 comprising one or more voids, and a line guide 24.

The deflector 22 has a rear side 23 opposite a front side 25. The deflector 22 having a rim 26. At or near the apex 34 of the deflector 22 is a line guide 24. In such a manner, the line guide 24 is centered within the deflector 22. The deflector 22 is preferably generally circular cup-shaped, having an apex 34 and a rim 26. The benefit of using a circular cup-shaped deflector 22 is that the deflector 22 has no up or down. Thus, if the deflector 22 rotates around the longitudinal axis (L) of the line guide during use, the performance of the device 20 is not compromised. While the deflector 22 in this exemplary fishing line wobble device 20 is illustrated as being generally circular cup-shaped, having a convex back side and a concave front side, other shapes of cup-shaped deflectors are envisioned, including, but not limited to, disc shapes, elliptical cup shapes, and Figure-8 outline shapes.

The first exemplary fishing line wobble device 20 comprises three voids defined in the deflector 22, namely the first void 52, the second void 54, and the third void 56. In other exemplary fishing line wobble devices, there may be more or less voids. The voids 52, 54, 56 are illustrated as having a generally arc-shape, and are radially disposed about the rim 26 of the fishing line wobble device 20. The voids 52, 54, 56 are illustrated in these figures as being equiradially spaced from the longitudinal axis (L) of the line guide 24. In other exemplary fishing line wobble devices, one or more of the voids can be radially disposed about the rim. These voids 52, 54, 56 can be formed within the deflector 22 (for instance during the molding process), can be created by the removal of a portion of the deflector 22, or can otherwise be formed.

The preferred shape of the voids is curved (arc-shaped), however, other void shapes are envisioned, including but not limited to: mortise, notch, elliptical shaped, parabolic shaped, sector shaped, irregular shapes, triangular shapes, quadrilateral shapes, and polygonal shapes.

The first void 52, second void 54 and third void 56 illustrated in these figures are illustrated as being generally identical to one another in shape, size and configuration. In other exemplary fishing line wobble devices, the voids may differ in number, size, shape and configuration, and a skilled artisan will be able to select an appropriate number, size, shape and configuration for the voids in a particular embodiment based on various considerations, including the intended use of the fishing line wobble device, the intended fishing environment within which the fishing line wobble device will be used, and the equipment and/or accessories with which the fishing line wobble device is intended to be used, among other considerations.

The line guide 24 extends to connect with the cup of the deflector 22. The line guide 24 preferably extends generally away from the portion of the deflector 22 containing the apex 34. In such a manner, the line guide 24 is preferably centered within/upon the deflector 22. As illustrated in these figures, the line guide 24 is preferably generally cylindrical tubular in shape. The line guide 24 has a first end 28 extending to a second end 30. The line guide 24 extends through the deflector 22 so that the first end 28 is inside the cup of the deflector 22, and the second end 30 is oriented away from the deflector 22. The first end 28 of the line guide 24 is illustrated as being integrated into the back side 23 of the deflector 22. Alternatively, the line guide 24 and second end 28 could extend further into the cup of the deflector 22.

The line guide 24 is oriented and attached generally perpendicular to the apex 34 of the deflector 22. Such an orientation also results in the line guide 24 being generally perpendicular to the rim 26.

In the preferred use, the rim end 26 of the wobble device 20 would be oriented on the fishing line 4 generally facing the fishing pole, and the line guide 24 end of the wobble device 20 would be oriented on the fishing line generally facing the fishing hook or lure.

Referring now to FIGS. 11 through 14C, when the wobble device 20 is connected to a length of fishing line 4 and attached fishing lure 2, and the combination is drawn though water, high pressure forms on the concave side of the deflector, and low pressure forms on the convex side of the deflector 22. This instability causes the cup of the deflector 22 to deflect water and wobble, causing the attached line guide 24 to wobble against (repeatedly contact) the fishing line 4, imparting energy and/or vibrations to the line 4 which cause the attached fishing hook or lure 2 to move and/or wobble through the water.

The inclusion of one or more voids defined in the rim of the deflector 22 disrupts the hydrodynamic flow, thereby resulting in the stabilization of the fishing line wobble device 20, and preventing over-wobbling of the deflector. This allows the fishing line wobble device 20 to function properly with a wide variety of bait styles, weights and sizes of bait.

Figure 15:
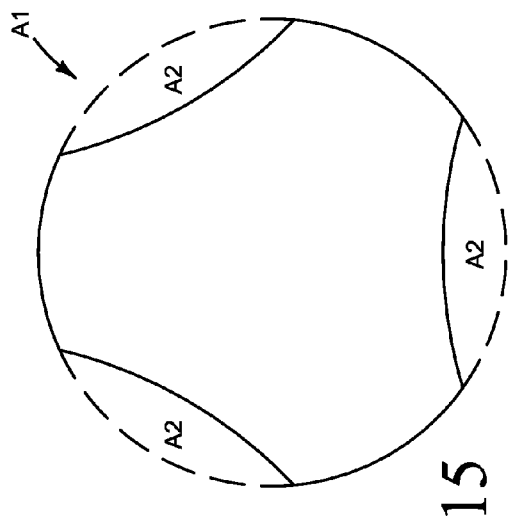
FIG. 15 is a schematic view of an exemplary fishing line wobble device.

As discussed above, exemplary fishing line wobble devices comprise at least one void defined in the deflector. The void(s) are preferably defined in the rim of the deflector. FIG. 15 is a schematic illustration of three voids (A2) defined in a deflector (A1). The deflector has a surface area. The voids define a voided surface area. The voided surface area in FIG. 15 would be three time the area of A2. Preferably, the ratio of the total voided surface area to the total surface area ranges from 3:17 (15%:85%) to 7:13 (35%:65%), although more or less may be used in an exemplary fishing line wobble device. More preferably, total voided surface area is 20% of the total surface area, for at ratio of total voided surface area to total surface area of 1:4.

Figure 16A:
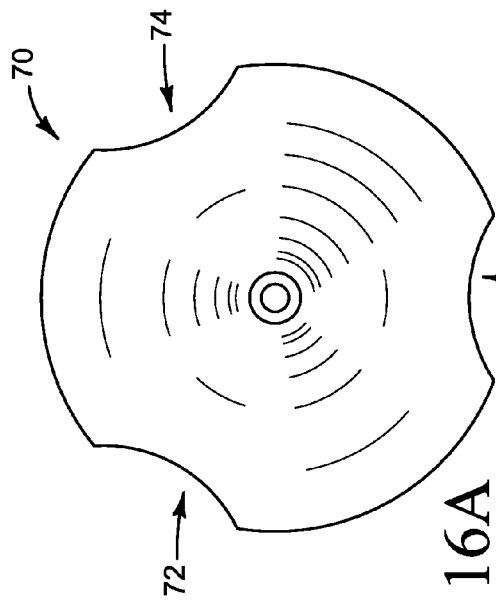
FIG. 16A is a rear elevation view of a second exemplary fishing line wobble device.
Figure 16C:
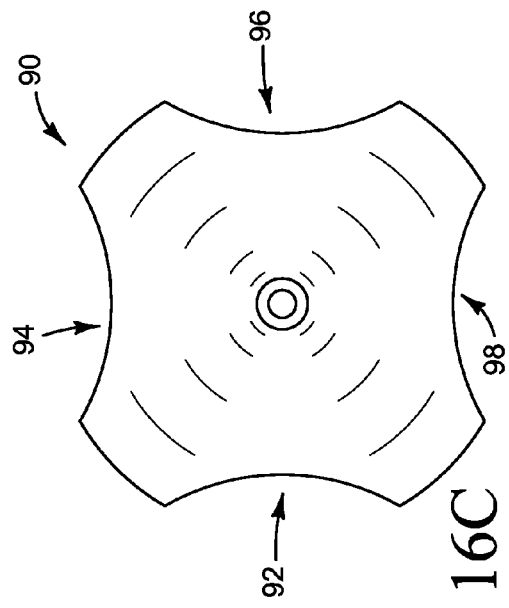
FIG. 16C is a rear elevation view of a fourth exemplary fishing line wobble device.
Figure 16B:
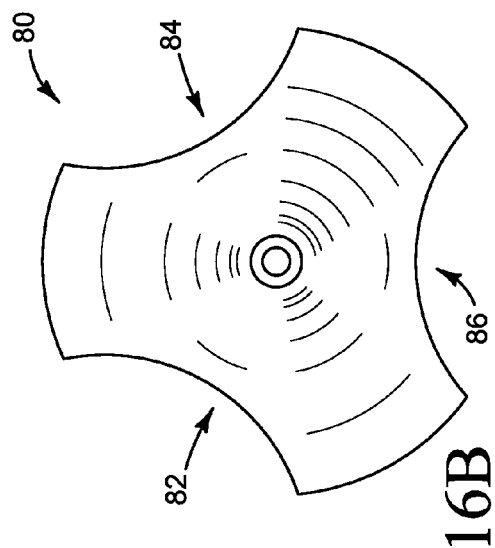
FIG. 16B is a rear elevation view of a third exemplary fishing line wobble device.

FIG. 16A illustrates a second exemplary fishing line wobble device 70 having a first void 72, a second void 74, and a third void 76. FIG. 16B illustrates a third exemplary fishing line wobble device 80 having a first void 82, a second void 84, and a third void 86. FIG. 16C illustrates a third exemplary fishing line wobble device 90 having a first void 92, a second void 94, a third void 96, and a fourth void 98.

A first example of an exemplary fishing line wobble device for causing a fishing hook attached to a fishing line to wobble as said fishing hook is pulled through water comprises a deflector defining a plurality of voids and an elongated line guide. The deflector for deflecting water. The deflector is generally cup-shaped, the general cup-shape defining an apex opposite a rim. The elongated line guide having first and second ends for slidably engaging the fishing line. The line guide extending through the deflector at the apex. The line guide attached to the deflector. The deflector comprises a plurality of voids disposed about the rim of the deflector.

Preferably, the plurality of voids is equiradially disposed about the rim of the deflector. Preferably, the number of voids is at least three. Preferably, at least one of the voids is arc-shaped. Preferably, the plurality of voids is arc-shaped, and is equiradially disposed about the rim of the deflector, and preferably the number of voids is at least three. Preferably, the deflector has a surface area, wherein the voids define a voided surface area, and wherein the ratio of total voided surface area to total surface area is from 3:17 to 7:13. More preferably, the ratio of total voided surface area to total surface area is 1:4. Preferably, the generally cup-shaped deflector comprises a generally concave front side and a generally convex back side. Preferably, the line guide is generally tubular. Preferably, the line guide and the deflector are formed of a molded plastic. Preferably, the line guide second end further comprises a lure attachment means for attaching the line guide to a fishing lure. Preferably, the line guide extends through the deflector generally perpendicular to the rim.

Exemplary fishing line wobble devices comprise a deflector for deflecting water, a line guide for allowing the device to slidably engage the fishing line, and one or more voids defined in the rim of the deflector. It is preferred that the deflector be cup-shaped, having an apex designating a rear side opposite a rim designating a front side. This rear side is oriented towards the fishing lure attached to the line. The deflector also having a line guide, this line guide preferably tubular and generally straight. The line guide preferably extends through the deflector, generally perpendicular to the rim, and extends away from the rear side of the deflector. The invented wobble device imparts a life-like wiggling motion to the fishing line. This line movement results in a life-like movement of natural and artificial fishing baits and lures including flies, worms, rubber baits, etc. which are attached to the line. The invented wobble device also helps keep weeds and other obstructions from snagging the hook of the tackle.

The preferred material for making the fishing lure wobble device is clear plastic, however other materials (composites, metals, natural materials, etc.) and colors are also envisioned and deemed included in this disclosure. Various external finishes (colors, etc.) are also envisioned, as is the inclusion of material within the plastic (i.e., glitter). Any suitable structure and/or material can be used for the fishing lure wobble device, and a skilled artisan will be able to select an appropriate structure and material for the fishing lure wobble device in a particular embodiment based on various considerations, including the intended use of the fishing lure wobble device, the intended arena within which the fishing lure wobble device will be used, and the equipment and/or accessories with which the fishing lure wobble device is intended to be used, among other considerations.

It is noted that all structure and features of the various described and illustrated embodiments can be combined in any suitable configuration for inclusion in a fishing lure wobble device according to a particular embodiment.

The foregoing detailed description provides exemplary embodiments of the invention and includes the best mode for practicing the invention. The description and illustration of these embodiments is intended only to provide examples of the invention, and not to limit the scope of the invention, or its protection, in any manner.

What is claimed is:

1. A fishing line wobble device for causing a fishing hook attached to a fishing line to wobble as said fishing hook is pulled through water, said fishing line wobble device comprising:
   a deflector for deflecting water, wherein said deflector is generally cup-shaped, defining an apex opposite a rim; and
   an elongated line guide, said line guide having first and second ends for slidably engaging said fishing line, said fishing line traveling through said line guide, said line guide extending through said deflector at said apex, said line guide attached to said deflector;

wherein said deflector comprises a plurality of voids disposed about and at the rim of said deflector.

2. The fishing line wobble device of claim 1, wherein said plurality of voids is equiradially disposed about the rim of said deflector.

3. The fishing line wobble device of claim 1, wherein the deflector has at least three voids.

4. The fishing line wobble device of claim 1, wherein at least one of said voids is arc-shaped.

5. The fishing line wobble device of claim 1, wherein said plurality of voids is each arc-shaped, and is equiradially disposed about the rim of said deflector.

6. The fishing line wobble device of claim 5, wherein the deflector has at least three voids.

7. The fishing line wobble device of claim 1, wherein the deflector has a surface area, wherein the voids define a voided surface area, and wherein the voided surface area to surface area is a ratio from 3:17 to 7:13.

8. The fishing line wobble device of claim 7, wherein the ratio of voided surface area to surface area is 1:4.

9. The fishing line wobble device of claim 1, wherein said generally cup-shaped deflector comprises a generally concave front side and a generally convex back side.

10. The fishing line wobble device of claim 1 wherein said line guide is generally tubular.

11. The fishing line wobble device of claim 1 wherein said line guide and said deflector are formed of a molded plastic.

12. The fishing line wobble device of claim 1, wherein said plurality of voids is equiradially disposed about the rim of said deflector, wherein the deflector has at least three voids, wherein at least one of said voids is arc-shaped, wherein the deflector has a surface area, wherein the voids define a voided surface area, and wherein the voided surface area to surface area is a ratio of 3:17 to 7:13.

13. The fishing line wobble device of claim 1, wherein said line guide extends through said deflector generally perpendicular to said rim.

14. A fishing line wobble device for causing a fishing hook attached to a fishing line to wobble as said fishing hook is pulled through water, said fishing line wobble device comprising:

a deflector for deflecting water, wherein said deflector is generally cup-shaped, defining an apex opposite a rim; and an elongated line guide, said line guide having first and second ends for slidably engaging said fishing line, said fishing line traveling through said line guide, said line guide extending through said deflector at said apex, said line guide attached to said deflector;

wherein said deflector comprises at least three voids equiradially disposed about and at the rim of said deflector.

15. The fishing line wobble device of claim 14, wherein at least one of said voids is arc-shaped.

16. The fishing line wobble device of claim 15, wherein all of said voids are arc-shaped.

17. The fishing line wobble device of claim 14, wherein the deflector has a surface area, wherein the voids define a voided surface area, and wherein the voided surface area to surface area is a ratio of 3:17 to 7:13.

18. The fishing line wobble device of claim 14, wherein a ratio of voided surface area to surface area is 1:4.

19. A fishing line wobble device for causing a fishing hook attached to a fishing line to wobble as said fishing hook is pulled through water, said fishing line wobble device comprising:

a deflector for deflecting water, wherein said deflector is generally cup-shaped, defining an apex opposite a rim; and an elongated line guide, said line guide having first and second ends for slidably engaging said fishing line, said fishing line traveling through said line guide, said line guide extending through said deflector at said apex, said line guide attached to said deflector;

wherein said deflector comprises three identical arc-shaped voids equiradially disposed about and at the rim of said deflector, wherein the deflector has a surface area, wherein the voids define a voided surface area, and wherein the voided surface area to surface area is a ratio of 3:17 to 7:13.

20. The fishing line wobble device of claim 19, wherein the ratio of voided surface area to surface area is 1:4.

\* \* \* \* \*